(12) United States Patent
Farouz-Fouquet

(10) Patent No.: US 11,459,086 B2
(45) Date of Patent: Oct. 4, 2022

(54) AERODYNAMIC LAMINAR FLOW STRUCTURE

(71) Applicant: Airbus Operations SAS, Toulouse (FR)

(72) Inventor: Mathias Farouz-Fouquet, Toulouse (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 218 days.

(21) Appl. No.: 16/829,314

(22) Filed: Mar. 25, 2020

(65) Prior Publication Data

US 2020/0307772 A1   Oct. 1, 2020

(30) Foreign Application Priority Data

Apr. 1, 2019 (FR) ...................................... 1903475

(51) Int. Cl.
*B64C 9/24* (2006.01)

(52) U.S. Cl.
CPC ...................................... *B64C 9/24* (2013.01)

(58) Field of Classification Search
CPC ................ B64C 9/22; B64C 9/24; B64C 9/26
See application file for complete search history.

(56) References Cited

U.S. PATENT DOCUMENTS

| | | |
|---|---|---|
| 6,135,395 A | 10/2000 | Collett |
| 2009/0302169 A1 | 12/2009 | Wright |
| 2011/0006165 A1 | 1/2011 | Ireland |
| 2016/0052621 A1 | 2/2016 | Ireland et al. |
| 2016/0076487 A1 | 3/2016 | Nakhjavani |
| 2018/0134374 A1 | 5/2018 | Schlipf et al. |

FOREIGN PATENT DOCUMENTS

| | | |
|---|---|---|
| EP | 3323514 A1 | 5/2018 |
| WO | 9847761 A1 | 10/1998 |

OTHER PUBLICATIONS

French Search Report; priority document.

*Primary Examiner* — Timothy D Collins
*Assistant Examiner* — Eric Acosta
(74) *Attorney, Agent, or Firm* — Greer, Burns & Crain, Ltd.

(57) ABSTRACT

An aerodynamic laminar flow structure comprises a flow body and a leading edge designed to face a flow circulating in a flow direction, the leading edge being movable and comprising a retracted position in which the edge of each of two flow surfaces of the flow body is joined respectively to an edge of each of two flow surfaces of the leading edge along a parting line having at least one portion inclined at an angle strictly less than 90° relative to the flow direction. The inclination of at least one portion of the parting line makes it possible to reduce drag and thus to retain a laminar flow over a major part of the exterior surfaces of the aerodynamic structure.

8 Claims, 6 Drawing Sheets

AERODYNAMIC LAMINAR FLOW STRUCTURE

CROSS-REFERENCES TO RELATED APPLICATIONS

This application claims the benefit of the French patent application No. 1903475 filed on Apr. 1, 2019, the entire disclosures of which are incorporated herein by way of reference.

FIELD OF THE INVENTION

The present invention relates to the field of flow structures. More particularly, it relates to a laminar flow structure.

BACKGROUND OF THE INVENTION

An aerodynamic flow structure may correspond to a wing of an aircraft or any other planar structure configured such as to experience a fluid flow, such as an airflow. An aerodynamic laminar flow structure means that this structure has a profile that makes it possible to maintain a laminar flow over a major part of the surface thereof.

In the case of an aircraft wing, a "laminar" wing offers several advantages. It makes it possible to reduce drag and to reduce fuel consumption. With a view to maintaining a laminar flow over a high percentage of the chord thereof, the laminar wing has a leading edge of which the radius of curvature is small relative to a "turbulent" wing. As a result, a laminar wing has a smaller maximum angle of attack than the maximum angle of attack of a turbulent wing. It may thus be subject to sudden stalling. In order to obviate these drawbacks, the leading edge of the laminar wing is equipped with a leading edge slat that makes it possible to increase the maximum lift of the wing in order to reduce the stall speed.

This leading edge slat is movable. In cruising flight, the leading edge slat lies in a retracted position, in which the exterior surfaces of the leading edge are at the same level as the exterior surfaces of the remainder of the wing, with a view to reconstituting a laminar flow over the rest of the wing. In point of fact, owing to manufacturing and assembly tolerances for the wing, and also because of aerodynamic forces affecting the wing, steps, due to an offset between the exterior surfaces of the leading edge slat and exterior surfaces of the rest of the wing, may arise. If too many steps arise, the laminar flow is disrupted. The flow then switches from laminar characteristics to turbulent characteristics in the region of the steps. In this case, the advantages of the laminar wing may no longer obtain.

SUMMARY OF THE INVENTION

An object of the present invention is to obviate these drawbacks by proposing an aerodynamic laminar flow structure that has a movable leading edge slat that retains a laminar flow over a major part of the exterior surfaces of the remainder of the wing.

To that end, the invention relates to an aerodynamic laminar flow structure comprising a flow body and a leading edge designed to face a flow circulating in a flow direction, the flow body comprising two first flow surfaces, each of the first flow surfaces comprising an edge, the leading edge comprising two second flow surfaces, each of the second flow surfaces comprising an edge, the leading edge being movable alternately between, on the one hand, a retracted position in which the edge of each of the first flow surfaces is joined respectively to an edge of each of the second flow surfaces along a parting line and, on the other hand, a deployed position in which the edge of each of the first flow surfaces and the edge of each of the second flow surfaces are unjoined.

According to the invention, the parting line has at least one portion inclined at an angle strictly less than 90° relative to the flow direction.

Thus, by virtue of the inclination of at least one part of the parting line, drag is reduced. As a result of this, the flow over the surfaces of the aerodynamic structure remains laminar over a major part of this surface after the parting line.

Advantageously, the parting line has a variable form having a plurality of inclined portions that are repeated in succession.

In a non-limiting manner, the one or more inclined portions are inclined by an angle less than 60° relative to the flow direction.

According to one embodiment, the variable form corresponds to a sinusoid.

According to another embodiment, the variable form corresponds to a sawtooth form.

According to one particular feature, the edge of each of the first flow surfaces has a rounded crest.

According to another particular feature, the edge of each of the second flow surfaces has a rounded crest.

Moreover, the parting line has at least one space between the edge of each of the first flow surfaces and the edge of each of the second flow surfaces, the one or more spaces being located between the inclined portions of the parting line.

Moreover, the aerodynamic laminar flow structure comprises an aspiration device configured such as to aspirate at least a portion of the flow through the one or more spaces.

The invention also relates to an aircraft, notably a transport aircraft, comprising at least one aerodynamic laminar flow structure as described above.

BRIEF DESCRIPTION OF THE DRAWINGS

The invention, with its features and advantages, will become more clearly apparent upon reading the description given with reference to the appended drawings, in which:

FIG. 9b shows a transverse section on a line A-A in FIG. 9a.

FIG. 9c shows a transverse section on a line B-B in FIG. 9a.

FIG. 10b shows a transverse section on a line A-A in FIG. 10a.

FIG. 10c shows a transverse section on a line B-B in FIG. 10a.

FIG. 11b shows a transverse section on a line A-A in FIG. 11a.

FIG. 11c shows a transverse section on a line B-B in FIG. 11a.

DETAILED DESCRIPTION OF THE PREFERRED EMBODIMENTS

The aerodynamic laminar flow structure 1 according to the invention comprises a flow body 2 and a leading edge slat 3 designed to face a flow circulating in a flow direction 4.

Figure 1:
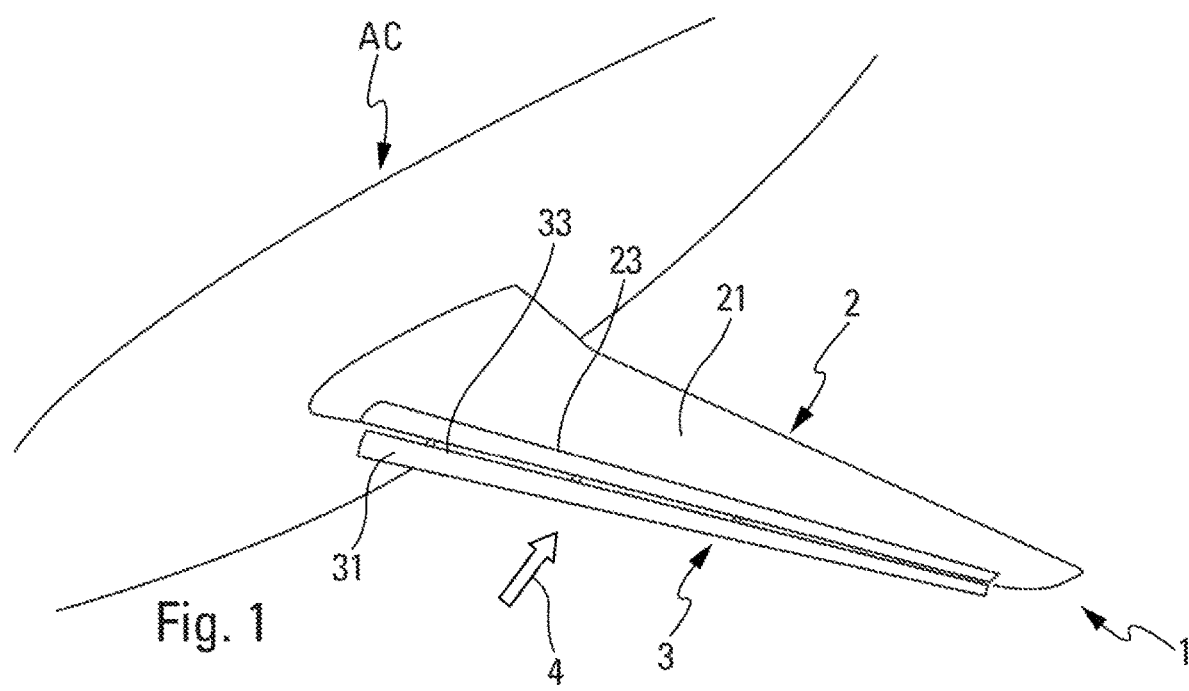
FIG. 1 shows a perspective view of an aircraft comprising at least one wing corresponding to an aerodynamic laminar flow structure.

For greater clarity in the remainder of the description, the leading edge slat is called "leading edge" and the aerodynamic laminar flow structure is called "structure." FIG. 1 shows an example of a structure 1. In FIG. 1, the structure 1 corresponds to a wing of an aircraft AC, in particular of a transport aircraft. The structure 1 may also correspond to any bearing surface or even to a horizontal tail assembly part of the aircraft AC.

Figure 2A:
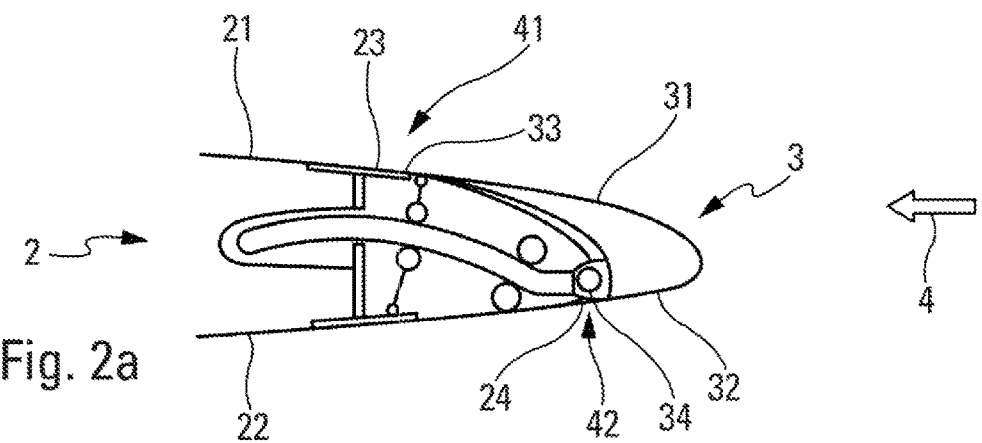
FIG. 2a shows a transverse section through an aircraft wing comprising a retracted leading edge.
Figure 2B:
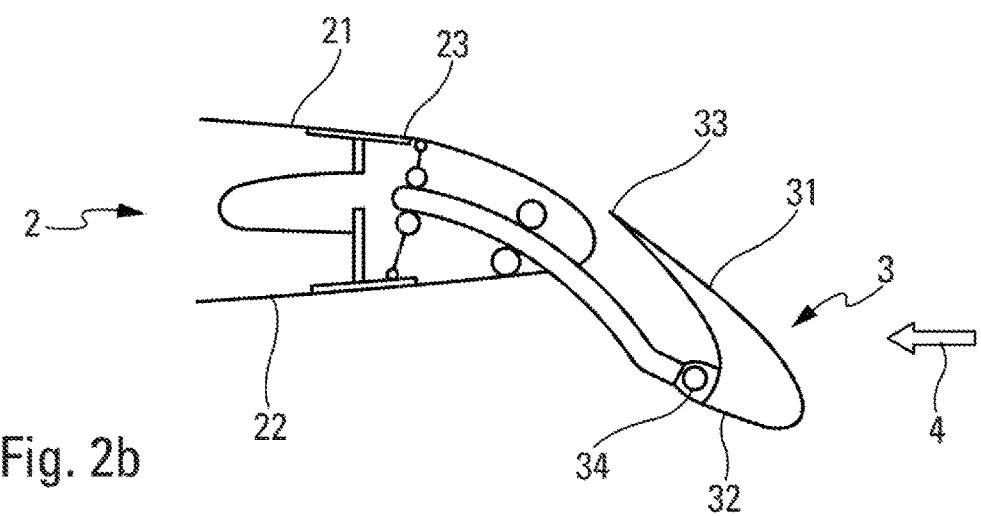
FIG. 2b shows a transverse section through an aircraft wing comprising a deployed leading edge.
Figure 3:
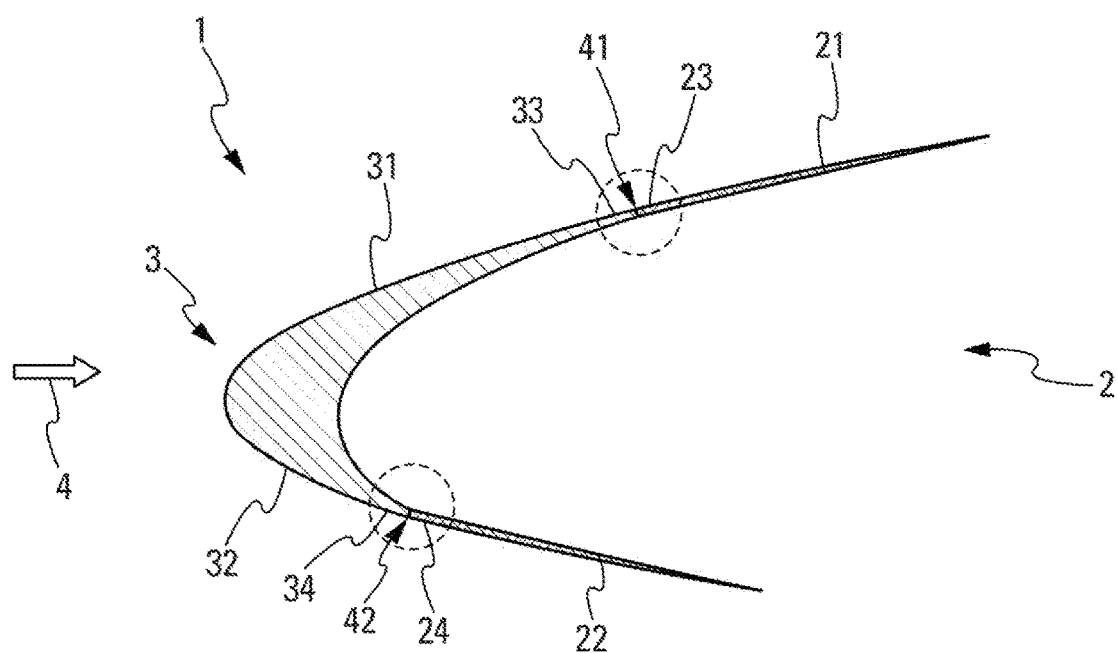
FIG. 3 shows a schematic transverse section through an aircraft wing with the leading edge retracted.

The flow body 2 comprises two flow surfaces 21, 22. In the case of a wing of an aircraft AC, the two flow surfaces 21 and 22 correspond to the upper and lower curves, respectively. Each of the flow surfaces 21, 22 comprises an edge 23, 24. The leading edge 3 comprises two flow surfaces 31, 32. Each of the flow surfaces 31, 32 comprises an edge 33, 34. The leading edge 3 is movable alternately between, on the one hand, a retracted position (FIG. 2a), in which the edge 23, 24 of each of the flow surfaces 21, 22 is joined respectively to an edge 33, 34 of each of the flow surfaces 31, 32 along a parting line 41, 42, and, on the other hand, a deployed position (FIG. 2b), in which the edge 23, 24 of each of the flow surfaces 21, 22 and the edge 33, 34 of each of the second flow surfaces 31, 32 are unjoined. Thus, in the retracted position, a parting line 41 exists between the flow surface 31 and the flow surface 21 and a parting line 42 exists between the flow surface 32 and the flow surface 22 (FIG. 3).

The parting line 41, 42 has at least one portion 43 inclined at an angle α strictly less than 90° relative to the flow direction 4 (FIGS. 6, 9a, 10a, 11a). This means that the angle α that exists between the flow direction 4 and the one or more inclined portions is strictly less than 90° and is greater than or equal to 0°.

Advantageously, the parting line 41, 42 has a variable form having a plurality of inclined portions 43 that are repeated in succession.

According to one embodiment (FIGS. 6, 9a, 10a, 11a), the variable form corresponds to a sinusoid.

According to another embodiment (not shown), the variable form corresponds to a sawtooth form.

Figure 6:
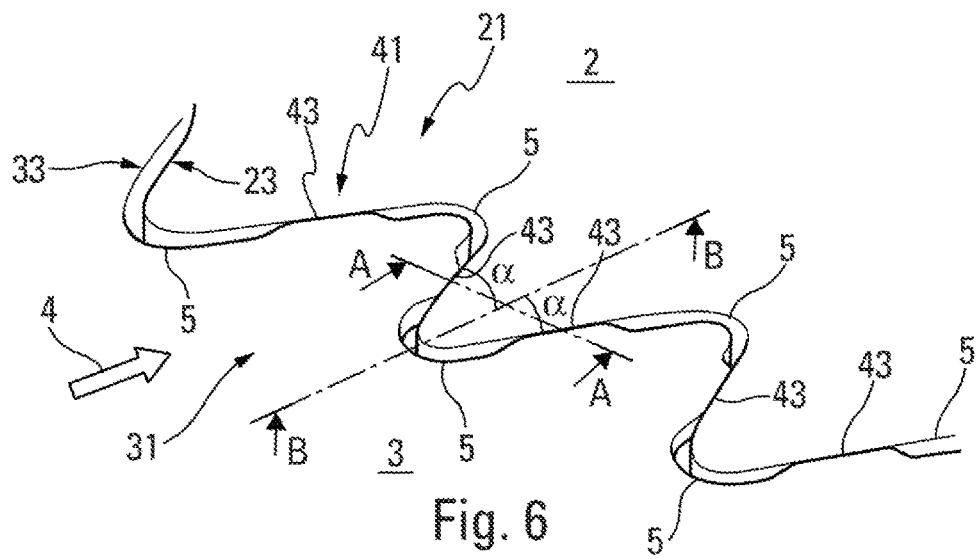
FIG. 6 shows a perspective view of one embodiment of the parting line.
Figure 7A:
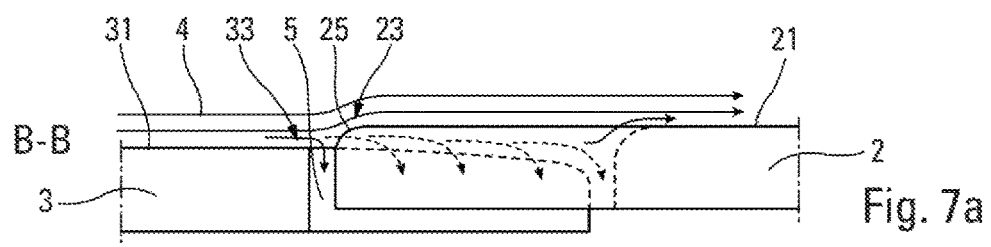
FIG. 7a shows a transverse section on a line A-A in FIG. 6 when the flow surface of the flow body is higher than the flow surface of the leading edge.
Figure 7B:
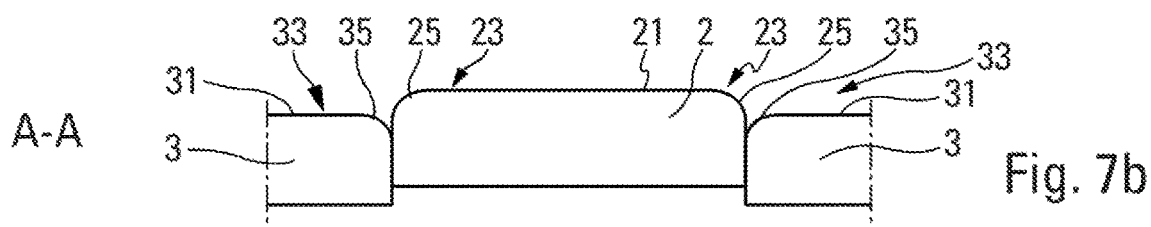
FIG. 7b shows a transverse section on a line B-B of FIG. 6 when the flow surface of the flow body is higher than the flow surface of the leading edge.

In a non-limiting manner, the one or more inclined portions 43 are inclined at an angle α less than 60° relative to the flow direction 4 (FIG. 6). Preferably, the angle α is less than 45°.

The inclination of the junction 41, 42 relative to the flow direction 4 makes it possible to reduce drag as compared with a junction perpendicular to the flow direction 4. Thus, the flow remains laminar after the parting line over a major part of the exterior surfaces of the aerodynamic structure 1. Furthermore, the step height tolerance between the angle of attack and the flow body may be greater.

In the case of a laminar wing of an aircraft AC, the flow of the air over the wing remains laminar over a major part of the exterior surfaces of the wing, even after the parting line 41, 42 between the leading edge 3 and the remainder of the wing 2.

Figure 4A:
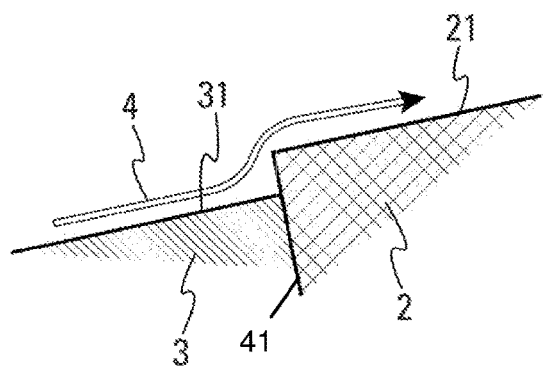
FIG. 4a shows a detail from FIG. 3, including a step facing the flow direction of the join between the flow surface and the flow surface 2.
Figure 4B:
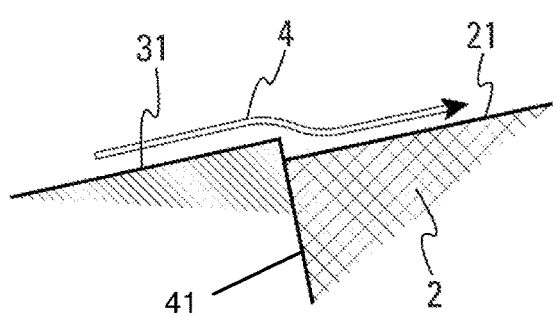
FIG. 4b shows a detail from FIG. 3, including a step oriented in the flow direction of the junction between the flow surface and the flow surface.
Figure 5A:
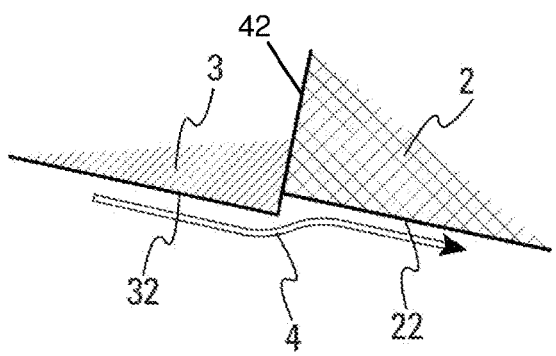
FIG. 5a shows a detail from FIG. 3, including a step facing the flow direction of the junction between the flow surface and the flow surface.
Figure 5B:
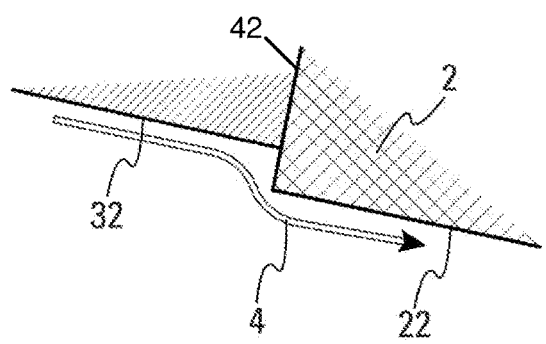
FIG. 5b shows a detail from FIG. 3, including a step oriented in the flow direction of the junction between the flow surface and the flow surface.

FIG. 4a shows a step facing the flow direction 4 of the junction 41 between the flow surface 31 and the flow surface 21. FIG. 4b shows a step oriented in the flow direction 4 of the junction 41, between the flow surface 31 and the flow surface 21. FIG. 5a shows a step facing the flow direction 4 of the junction 42 between the flow surface 32 and the flow surface 22. FIG. 5b shows a step oriented in the flow direction 4 of the junction 42, between the flow surface 32 and the flow surface 22.

Advantageously, the edge 23, 24 of each of the flow surfaces 21, 22 has a rounded crest 25.

Similarly, the edge 33, 34 of each of the second flow surfaces 31, 32 has a rounded crest 35 (FIG. 7a, 7b, 8a, 8b, 9a, 9b, 9c, 10a, 10b, 10c, 11a, 11b, 11c).

A rounded crest makes it possible to prevent vortices. Thus, the rounded crest 25, 35 helps to keep the flow laminar after the parting line 41, 42.

Preferably, the parting line 41, 42 has at least one space 5 between the edge 23, 24 of each of the flow surfaces 21, 22 and the edge 33, 34 of each of the flow surfaces 31, 32. The one or more spaces 5 are located between the inclined portions 43 of the parting line 41, 42. Thus, when the junction corresponds to a variable sinusoidal form, the spaces 5 are located between the inclined portions 43 in the region of the peaks and of the furrows of the sinusoid.

As in FIG. 6, the spaces 5 may be formed by reducing the height of the peaks and the depth of the furrows of the sinusoid of the edge 23, 24, 33, 34 of one of the two flow surfaces 21, 22, 31, 32. In FIG. 6, the peaks and the furrows are reduced for the edge 33 of the leading edge 3. Only the inclined portions 43 of the edge 33 of the leading edge 3 are adjusted to the inclined portions 43 of the edge 23 of the flow body 2.

These spaces 5 are configured such as to serve as local aspiration zones in the region of curved portions substantially perpendicular to the flow direction 4. These local aspiration zones make it possible to prevent vortices. Thus, these spaces 5 help the flow to remain laminar after the parting line 41, 42, in particular in portions of the parting line 41, 42 that are substantially perpendicular to the flow direction 4.

Figure 8A:
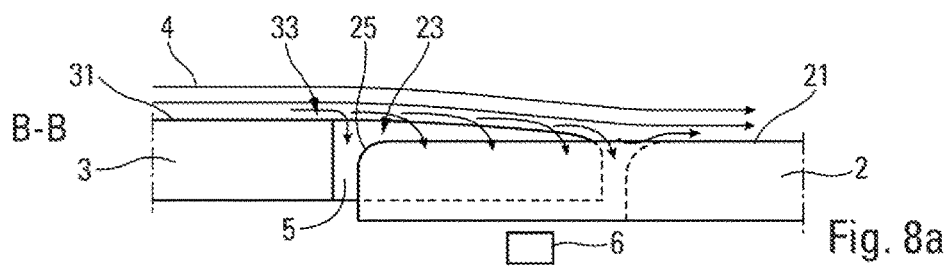
FIG. 8a shows a transverse section on a line A-A of FIG. 6 when the flow surface of the flow body is lower than the flow surface of the leading edge.
Figure 8B:
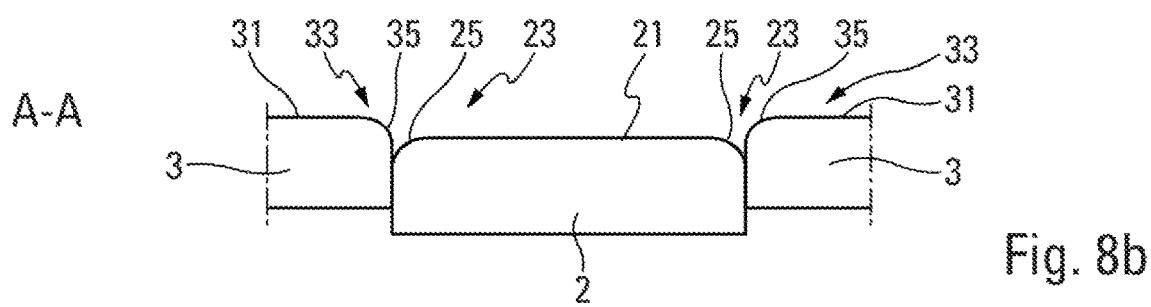
FIG. 8b shows a transverse section on a line B-B of FIG. 6 when the flow surface of the flow body is lower than the flow surface of the leading edge.
Figure 9A:
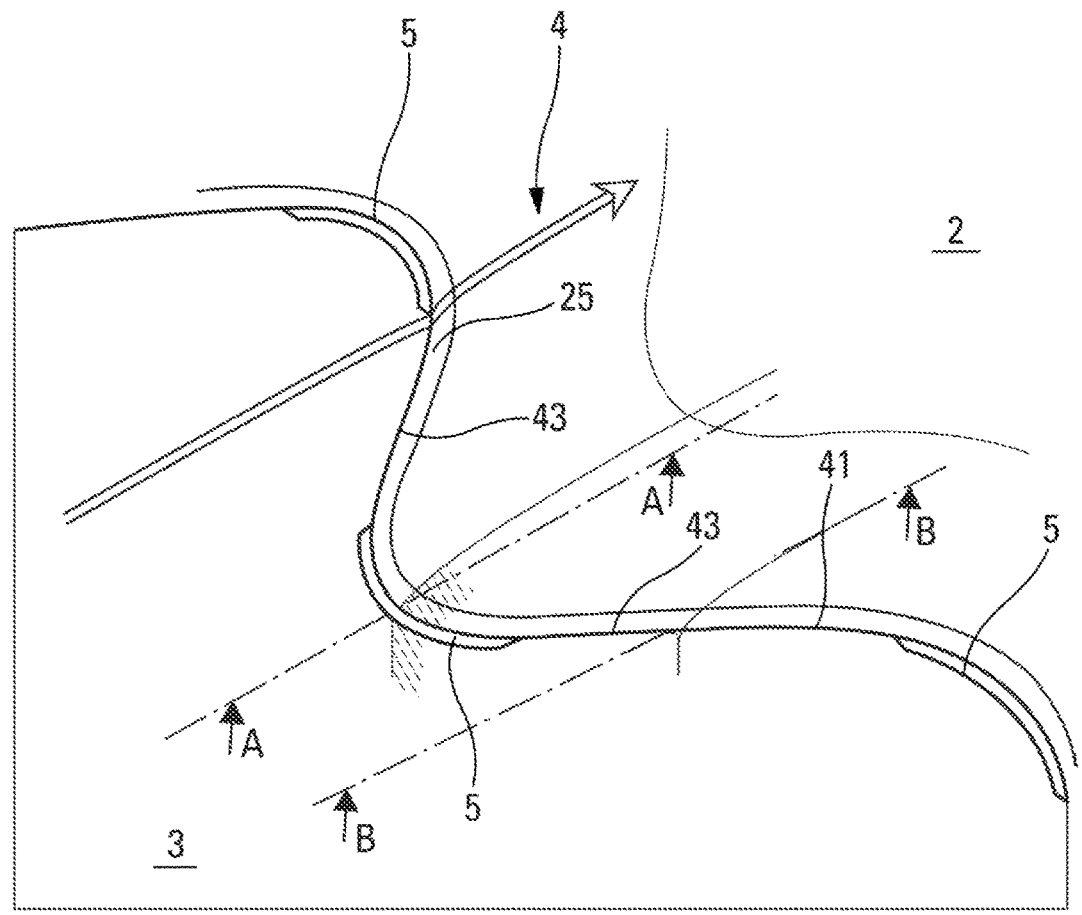
FIG. 9a shows a perspective view of one embodiment of the parting line when the flow surface of the leading edge is at the same level as the flow surface of the flow body.
Figure 9B:
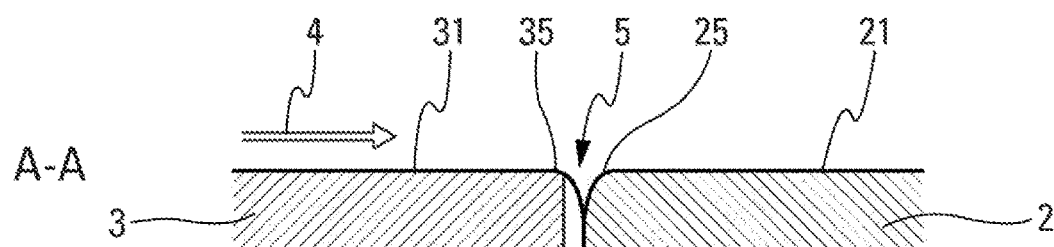
Figure 9C:
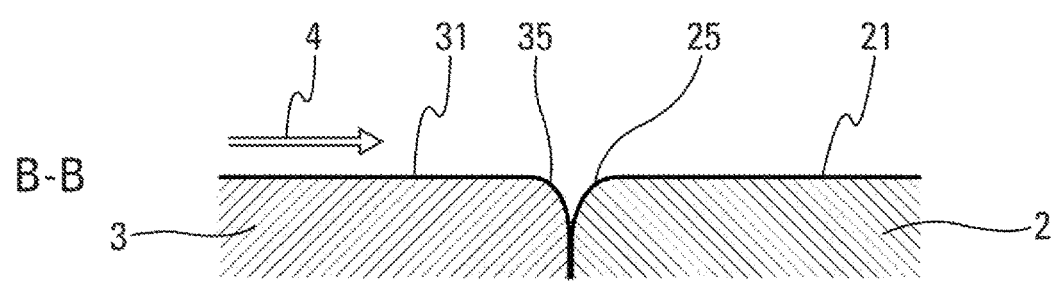
Figure 10A:
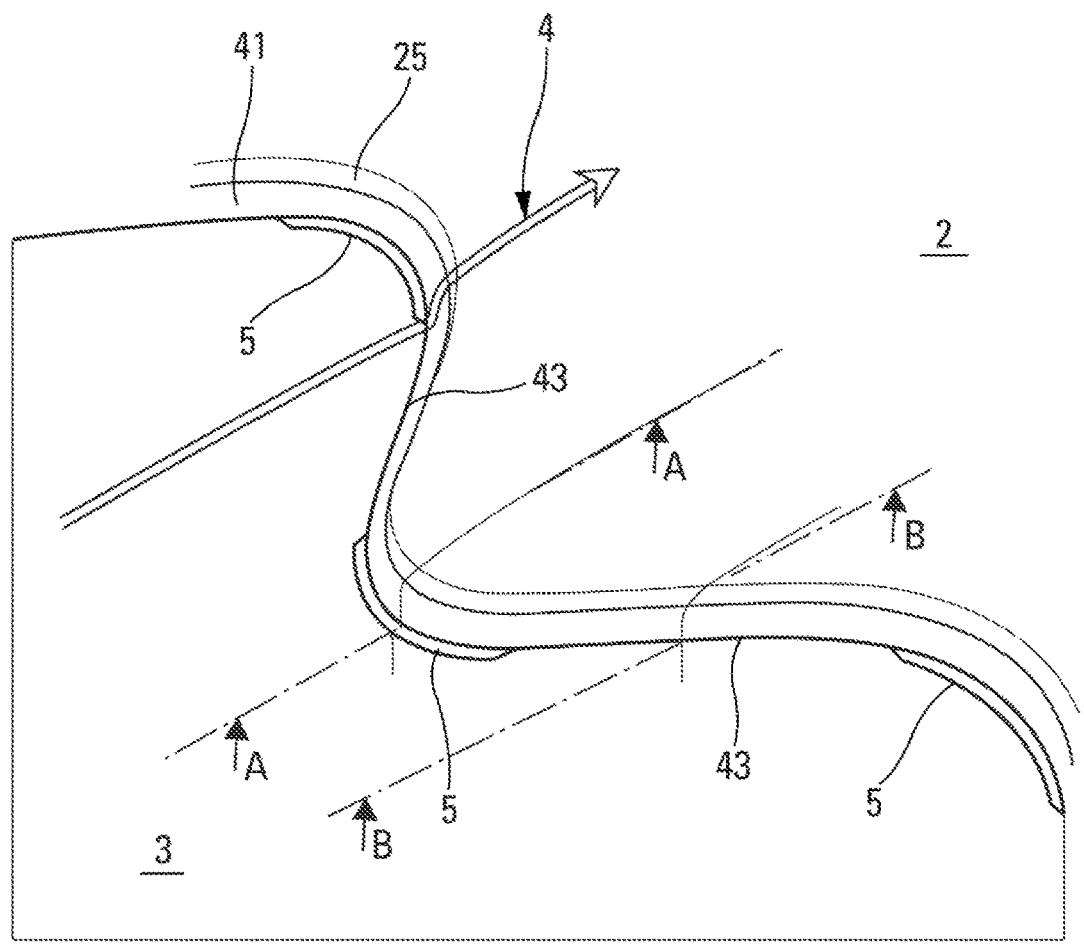
FIG. 10a shows a perspective view of one embodiment of the parting line when the flow surface of the leading edge is lower than the flow surface of the flow body.
Figure 10B:
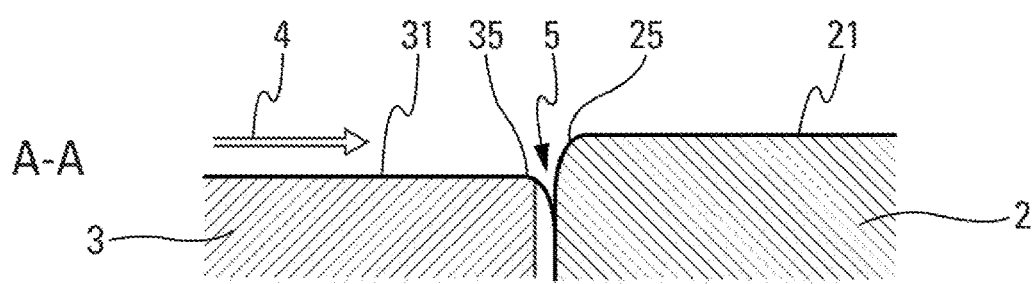
Figure 10C:
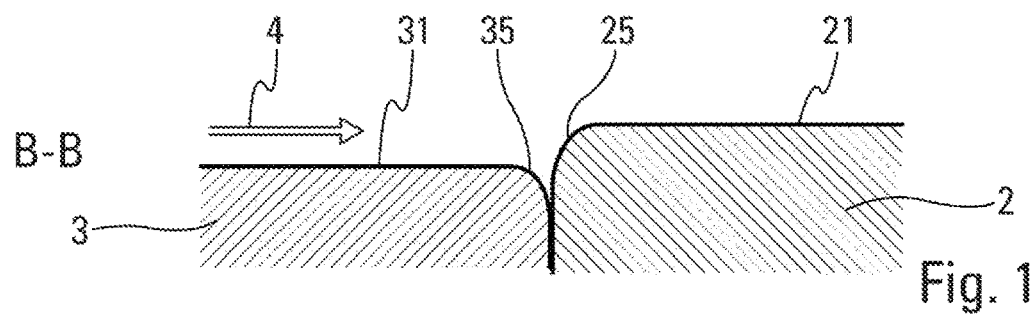
Figure 11A:
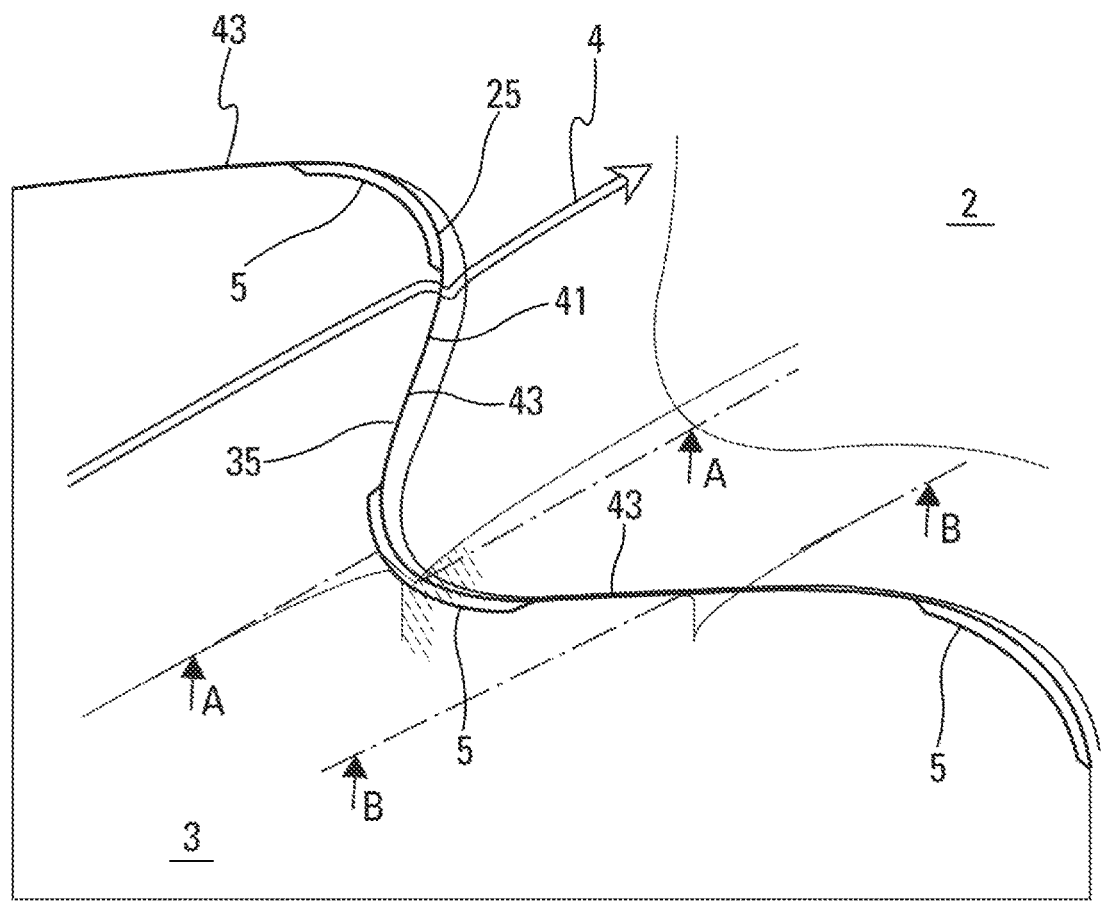
FIG. 11a shows a perspective view of one embodiment of the parting line when the flow surface of the leading edge is higher than the flow surface of the flow body.
Figure 11B:
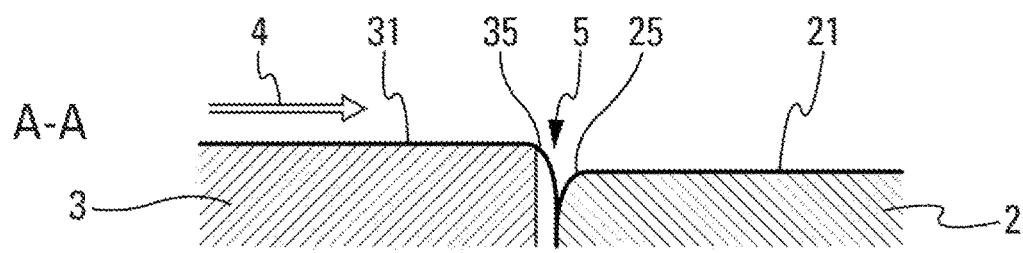
Figure 11C:
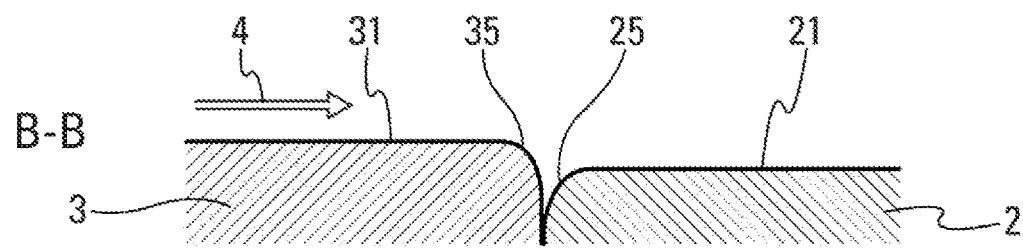

The structure 1 may comprise an aspiration device 6 configured such as to aspirate at least a part of the flow through the one or more spaces 5 (FIG. 8a).

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aerodynamic laminar flow structure comprising:
a flow body and a leading edge configured to face a flow circulating in a flow direction, the flow body comprising two first flow surfaces, each of the first flow surfaces comprising an edge, the leading edge comprising two second flow surfaces, each of the second flow surfaces comprising an edge, the leading edge being movable alternately between a retracted position, in which the edge of each of the first flow surfaces is joined respectively to an edge of each of the second flow surfaces along a parting line, and a deployed position, in which the edge of each of the first flow surfaces and the edge of each of the second flow surfaces are unjoined,
wherein the parting line has at least one portion inclined at an angle strictly less than 90° relative to the flow direction,
wherein one or both of the edge of each of the first flow surfaces or the edge of each of the second flow surfaces has a rounded crest.

2. The structure according to claim 1, wherein the parting line has a variable form having a plurality of inclined portions that are repeated in succession.

3. The structure according to claim 1, wherein the at least one inclined portion is inclined by an angle less than 60° relative to the flow direction.

4. The structure according to claim 1, wherein the parting line has a variable form corresponding to a sinusoid.

5. The structure according to claim 1, wherein the parting line has a variable form corresponding to a sawtooth form.

6. The structure according to claim 1, wherein the parting line has at least two portions inclined at an angle and at least one space between the edge of each of the first flow surfaces and the edge of each of the second flow surfaces, the at least one space being located between the inclined portions of the parting line.

7. The structure according to claim 6, further comprising an aspiration device configured such as to aspirate at least a portion of the flow through the at least one space.

8. An aircraft comprising at least one aerodynamic laminar flow structure as defined in claim 1.

* * * * *